(12) United States Patent
Azima et al.

(10) Patent No.: US 6,252,676 B1
(45) Date of Patent: Jun. 26, 2001

(54) SYSTEM AND METHOD FOR PROOFING

(75) Inventors: Fariborz Azima, Derry, NH (US); Lusheng L. Xu, Chelmsford, MA (US)

(73) Assignee: AGFA Corporation, Wilmington, MA (US)

( * ) Notice: Subject to any disclaimer, the term of this patent is extended or adjusted under 35 U.S.C. 154(b) by 0 days.

(21) Appl. No.: 09/090,072

(22) Filed: Jun. 3, 1998

Related U.S. Application Data

(60) Provisional application No. 60/048,603, filed on Jun. 4, 1997.

(51) Int. Cl.$^7$ .................................................... G06K 9/34
(52) U.S. Cl. ............................................ 358/1.9; 382/298
(58) Field of Search ........................... 358/1.9, 534–536, 358/456–459; 382/298–299

(56) References Cited

U.S. PATENT DOCUMENTS

| | | | | |
|---|---|---|---|---|
| 4,288,821 | * | 9/1981 | Lavalee et al. | 358/293 |
| 4,447,830 | * | 5/1984 | Stoffel | 358/283 |
| 5,341,226 | * | 8/1994 | Shiau | 358/518 |
| 5,434,953 | * | 7/1995 | Bloomberg | 395/139 |
| 5,852,678 | * | 12/1998 | Shiau et al. | 382/176 |
| 5,964,156 | * | 10/1999 | Smith et al. | 101/471 |

* cited by examiner

Primary Examiner—Thomas D. Lee
Assistant Examiner—Stephen Brinich
(74) Attorney, Agent, or Firm—Robert A. Sabourin; Ira V. Heffan

(57) ABSTRACT

In one aspect, the invention features a system and method for displaying an image on an output device. The method includes creating an image having one or more separations with an imaging application thereby forming a description of the image in a page description language. The method includes processing the description of the image in the page description language thereby creating a raster for each color separation associated with the image. The method also includes selecting a subset of the rasters for proofing. The method includes creating a second page description language file including each of the selected subset of the rasters for proofing and imaging the second page description language file with an output device. The system includes a raster image processor for processing the description of the image in the page description language thereby creating a raster for each color separation associated with the image. The system also includes a preproofer for selecting a subset of the rasters for proofing, and for descreening, resizing and combining each of the subset of rasters for proofing to create a second page description language file including the descreened, resized, and combined each of the selected subset of the rasters for proofing. The system also includes a proofer for imaging the second page description language file.

20 Claims, 6 Drawing Sheets

SYSTEM AND METHOD FOR PROOFING

This application claims the benefit of U.S. Provisional Patent Application No. 60/048,603 filed on Jun. 4, 1997.

The invention relates to electronic prepress and imagesetting systems. More particularly, the invention relates to a method and apparatus for displaying a proof image on an output device.

BACKGROUND INFORMATION

Printing presses use plates to print ink onto paper and other media. One method used for creating plates is to expose photosensitive film with the matter to be printed. When the film is developed, the matter imaged on the film may be imaged onto a photosensitive plate, sometimes referred to as "burning" a plate. After processing, the plate can be used on a press to print the matter onto a medium. Part of the plate, usually the part defining the image to be printed, retains ink, while the other part of the plate does not. When the plate is introduced to ink and then to paper or other medium, the image is printed on the medium.

In a black and white printing job, there is usually one plate that is used to print black ink. In a color printing job, a different plate may be used for each color ink. A color job may use three colors of ink, usually cyan, magenta, and yellow, which in combination can be used to make other colors. A plate is usually produced for each color ink. Often, in addition to cyan, magenta, and yellow, black ink is also used. An additional plate is then required to print the black ink. Occasionally, one or more colors will be printed separately as well, referred to as a "spot color." That color will also have its own plate.

Electronic prepress systems have used an imagesetter to receive faster data associated with a plate and to image the raster data onto photosensitive film. In this context, a raster may specify an image by pixels in columns and rows. The film is then used to create a plate. The imagesetter exposes the photosensitive film pixel by pixel. One way that imagesetters image the raster data is to scan a laser across and down a piece of film. Electronics control the laser to expose, or refrain from exposing, each pixel in the raster data. The imagesetter images the pixels on the film in a manner that is precise and repeatable. Recently, platesetters also have been used to create plates directly from raster data without the use of intermediate film. Imagesetters, platesetters and like print engines, including proofers, are also referred to generally as output devices. In this context, imagesetters, platesetters and output devices used to image on material used to make a plate, for example on film and plate, are referred to as final output devices.

Print engines typically have been served by a dedicated raster image processor ("RIP") connected between the print engine and a "front end" computer running imaging application software. An example of such a front end computer is an Apple Macintosh™ running Quark Express™ imaging software. Other examples include, but are not limited to, Adobe Pagemaker™ and Luminous PressWise™. In a typical example configuration, the Macintosh™ is connected to an Agfa Atlas™ RIP, which communicates with an Agfa Accuset™ imagesetter. The RIP interprets the graphic information transmitted to it by the front end, and converts the graphic information into raster data that can be imaged by the print engine. The raster data produced by the RIP typically depends on the capabilities of the imagesetter, such as the imaging resolution and the media type and media size loaded into the imagesetter.

The imaging application software may provide output in the format of a page description language. An example of such a page description language is Postscript™ and PDF™ offered by Adobe Systems of Mountain View, Calif. Page description languages describe images using descriptions of the objects contained in the page. Use of page description languages allow pages to be described in a way that can be interpreted appropriately for imaging at various sizes and resolutions. Page description language code is generally significantly smaller in data size than the raster data that results from interpreting the page description language code. Use of a page description language therefore allows for transfer of what would be very large image data files over relatively slow serial data communication lines. The same page description language code will be interpreted into different raster data depending on the characteristics of the output device.

When a page description language image file data is received by a RIP, operations performed by the RIP, such as using fonts to lay out text and using color processing to create raster data for each color, results in one or more raster data bit maps. The raster data produced by the RIP is usually binary, meaning that each pixel is either on or off, as distinguished from a contone raster, which includes at least one color level for each pixel. The raster data for each of the colors in a color image are referred to as color "separations." Each separation is transferred from the RIP to the output device over a high speed interface.

When an output device images on film, it is possible to inspect the film before creating a plate. If the image on the film contains an error that may be observed by inspecting the film, such as misaligned, misplaced, or incorrectly included or excluded graphics, text, or colors, the error can be corrected, and a new film imaged. The corrected film may then be used to create the plate. When the output device images directly onto a plate, there is no intermediate film step. It is therefore not possible to observe the results of RIP processing until the plate is made.

When an output device will output directly onto plate, and often when imaging onto film, it is therefore helpful to first image a "preview" version of the image. The quality of the preview image is limited by the quality of preview output devices. Preview output devices are commercially available, and are sometimes referred to as proofers. These output devices generally accept page description language image files as input and produce images that integrate one or more separations onto a single sheet of paper or film. The proofer output, sometimes referred to as a proof image, may resemble the final image output that will be produced by the press. The proof image may be used to verify text, graphics, and color layout. The effectiveness of the proof image is determined by the extent that the proof image resembles the final output.

One reason that a proof image may not resemble the final output is that the page description language interpreter used by a proofer may interpret the same page description language differently than the RIP that provides raster data to the final output device. In this case, there may be significant differences between a final image and the proof image. For example, on the proof image there may be differences in the overlay of image elements resulting in text that may appear to be missing or covered by graphics, while this artifact may not be visible in the final image. As another example, text may appear to be properly placed on the proof image, but be incorrectly placed in the final image.

The problem of having a proof image that is different from the final image reduces the efficiency and adds cost to an electronic prepress system, especially, but not exclusively with the use of direct-to-plate technology.

SUMMARY OF THE INVENTION

In one aspect, the invention is a method for imaging on an output device. The method includes processing an image to create a first raster of the image, descreening the raster to form a proofer raster of the image, and imaging the proofer raster on the output device. In one embodiment, the imaging step includes imaging the proofer raster on a proofer. In another embodiment, the step of imaging the proofer raster on the proofer includes converting the proofer raster into TIFF format, wrapping the TIFF format proofer raster in a page description language wrapper, and transmitting the TIFF format proofer raster wrapped in the page description language wrapper to the output device. In another embodiment, the method includes compensating for characteristics of the output device by modifying the proofer raster. In another embodiment, the method includes resizing the proofer raster to fit the image on the proofer.

In another aspect, the invention features a method for imaging on a proofer, which includes processing an image to create a plurality of rasters representing color separations of an image. The method also includes descreening each of the rasters to form respective descreened rasters, combining the descreened rasters into a proofer raster, and imaging the proofer raster on an output device. In one embodiment, the method includes, before the imaging step, defining a user-defined output color space, and modifying the proofer raster to conform to the user-defined output color space. In another embodiment, the method includes compensating for characteristics of the output device by modifying the proofer raster. In another embodiment, the method includes resizing each of the respective descreened rasters to fit the image on the proofer. In another embodiment, the method includes decompensating the proofer raster because each of the plurality of rasters representing color separations of the image had been precompensated. In another embodiment, the step of combining the descreened rasters includes merging spot colors and process colors into the proofer raster. In another embodiment, the step of imaging the proofer raster on the proofer includes converting the proofer raster image into TIFF format, wrapping the proofer raster image in TIFF format in a page description language wrapper, and transmitting proofer raster image in TIFF format in a page description language wrapper to the proofer.

In another aspect, the invention features a method for imaging an image on a proofer that includes creating a page having one or more separations with an imaging application thereby forming a description of the page in a page description language. The method also includes processing the description of the page in the page description language thereby creating a raster for each color separation associated with the page. The method also includes selecting a subset of the rasters for proofing, creating a second page description language file including each of the selected subset of the rasters for proofing, imaging the second page description language file with an output device. In one embodiment, the describing step comprises converting each raster into TIFF format. In another embodiment, the step of creating a second page description language file includes converting each of the selected subset of the rasters into TIFF format and wrapping the TIFF format rasters in page description language.

In another aspect, the invention features a system for imaging on a proofer. The system includes a front end including an imaging application for creating an image having one or more separations and for forming a description of the image in a page description language. The system also includes a raster image processor for processing the description of the image in the page description language thereby creating a raster for each color separation associated with the image. The system also includes a preproofer for selecting a subset of the rasters for proofing, and for descreening, resizing. and combining each of the subset of rasters for proofing to create a second page description language file including the descreened, resized, and combined each of the selected subset of the rasters for proofing. The system also includes a proofer for imaging the second page description language file. In one embodiment, the preproofer converts each of the selected subset of the rasters into TIFF format and wraps the TIFF format rasters in page description language. In another embodiment, the preproofer descreeens and resizes by averaging. In another embodiment, the preproofer compensates for characteristics of an output device by modifying the second page description language file. In another embodiment, the preproofer automatically selects all of the rasters for each color separation associated with the image, and descreens, resizes, and combines all the rasters to create the second page description language file.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF THE PREFERRED EMBODIMENTS

Figure 1:
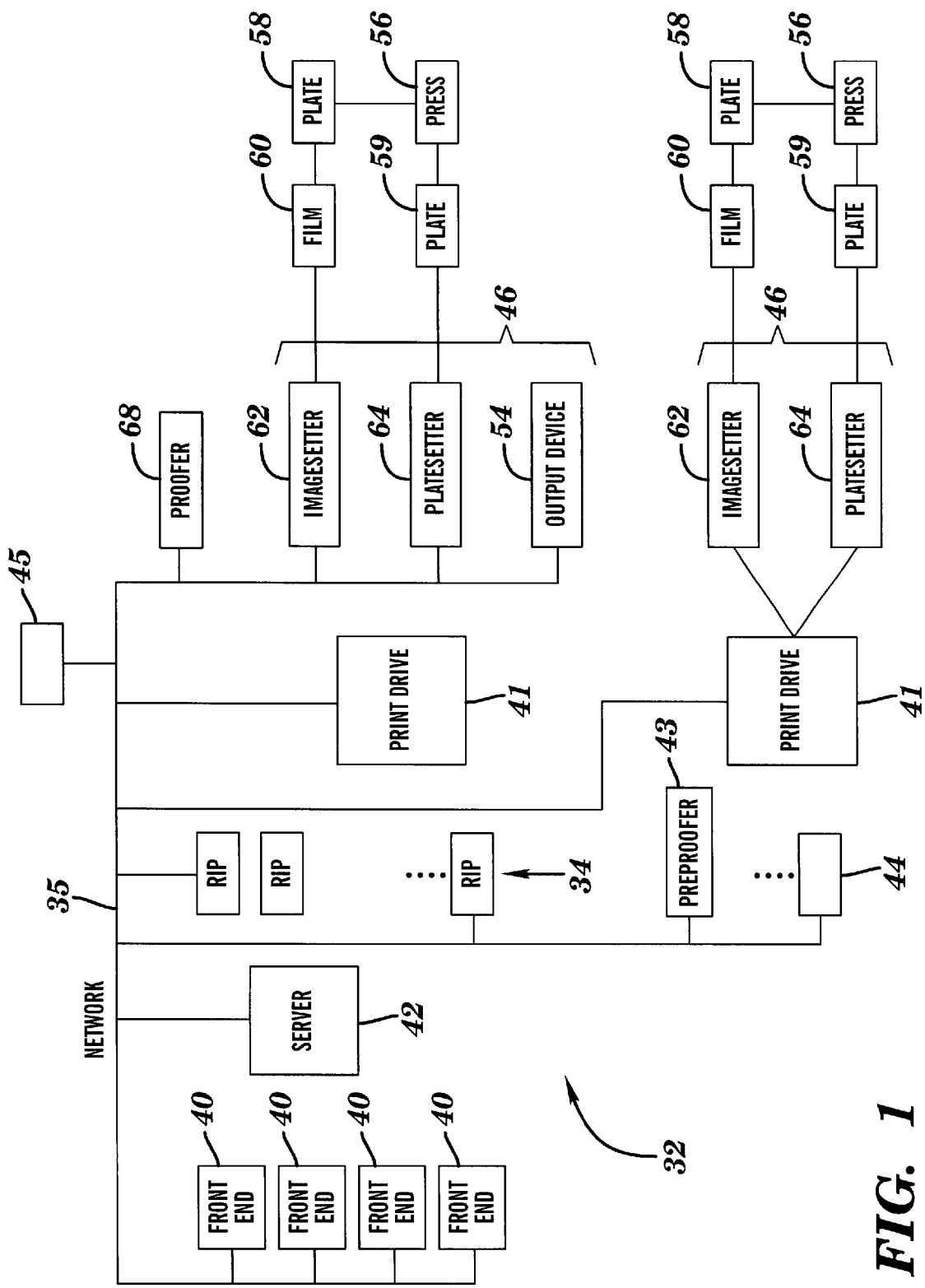
FIG. 1 is a block diagram of an embodiment of a prepress imaging system according to the present invention.

Referring to FIG. 1, a prepress system, generally referred to by reference numeral 32, includes one or more computers that are referred to as front ends 40. The front ends 40 are connected to computer network 35. The front ends 40 are used for creating, editing, or otherwise preparing image data for printing. Both color and black and white images are prepared on the front ends 40 for processing by the prepress system and eventual image reproduction by a printing press 56 using a printing plate 58. The printing press 56 is not considered part of the prepress system 32. The front ends 40 can be commercially available computers, for example including, but not limited to computers having operating systems such as Windows NT™, Mac OS™, or a version of UNIX™. The front ends 40 have imaging application software such as that commercially available as Quark Express™ and Adobe Pagemaker™. The front ends 40 may also have imposition software used to lay out pages within an image, such as Impostrip™. Impositioning software positions one or more pages within an image, so that multiple pages are presented in a single image. Having multiple pages imaged on a single plate increases productivity, because multiple pages are printed at the same time. The imaging application software and the imposition software both produce images coded in a page description language. The front ends 40 can output images coded in a page description language directly to raster image processors ("RIPs") 34 via the network 35. The front ends 40 can also output images to an image server 42 via the network 35.

The network 35 can be any of the various types of commercially available computer networks, but must be of sufficient capacity to handle the traffic generated by the prepress system. In one embodiment, the network is a Fast Ethernet network, including a 100baseT Hub and appropriate connections between the networked components and the hub.

In one embodiment, image server 42 receives images output from front ends 40 and stores them on the system. Image server 42 can queue jobs for immediate transmission to one of the RIPs 34 when a RIP 34 becomes available. Image server 42 can also store images from the front ends 40 for later processing by RIPs 34. Image server 42 helps improve workflow efficiency by allowing front end users to output their jobs even if the RIPs 34 are busy. By queuing a job for the RIP 34 on the server 42, the RIP 34 can be kept continuously busy.

The RIPs 34 may be software RIPs operating on a computer system, which may be one of the front ends 40, or on a server class computer system. Such software RIPs include the Agfa Viper™ software RIP and the Agfa Taipan™ software RIP available from Agfa Division of Bayer Corporation in Wilmington, Mass. The RIPs 34 may also be dedicated hardware RIPs, such as the AgfaStar™ hardware RIP, also available from Agfa. Each RIP 34 has a software and/or hardware RIP module for RIP functions such as screening, trapping, imposition, page or image combination, color separating, and/or color management of image data.

The RIPs 34 each include an input network interface module over which text page description language or other types of input image files are received from front ends 40 or the image server 42. Each RIP 34 thus appears on the network and can be accessed by any front end 40 or the image server 42 or other computer system on the network 35. The input network interface module may also serve as an output network interface module so that a single network interface connection connects each RIP 34 to the network 35. In another embodiment, a separate network connection connects each RIP 34 to a print drive 41 to maximize system performance.

A print drive 41 includes a plurality of software modules operating on a standard computer platform configured for efficient print drive functions. The print drive hardware may also include a number of interface boards or modules including a fast network interface and hardware connection to an output device 46 such as an imagesetter 62 or platesetter 64. Print drive 41 receives raster data that is output from RIPs 34, and stores the images for output by output devices 46. Print drive 41 may be connected to the RIPs 34 via the network 35, or may have individual connections to the RIPs. The print drive 41 may be directly connected to the output devices 46, as shown in the embodiment of FIG. 1, or it may connect with the output devices via network 35, or via other connections. The final output devices 46 include imagesetters 62 and platesetters 64. Output devices can also include proofer 68, and printers and plotters 54, and such other output devices used in the industry.

Imagesetter 62 images on photosensitive film or paper. The photosensitive film 60 is used to make at least one plate 58. A plate 58 is used on press 56 to print one color of an image. On a black and white image, only one color, black, is usually necessary. For a color image, generally at least the three "process" colors, cyan, magenta, and yellow, and often a fourth color, black, are used. These colors are sometimes referred to as "CMYK." One or more "spot colors," which refers to an additional color, may be used as well. The imagesetter 62 images the raster data for each color onto film, and the film is used to make a plate 58. The plates are then used on the press to print high quality printed material, often in large quantities. This result of the electronic prepress printing process may be referred to as the final image. Examples of imagesetters are the Selectset Avantra™, the SelectSet 7000™, and the AccuSet Plus™ imagesetters, all available from Agfa Division, Bayer Corporation of Wilmington, Mass.

Platesetter 64 images directly onto a plate 59, without the use of film 60. By use of a platesetter 64, the step of creating a plate 58 by using film 60 is eliminated. This can improve the workflow, because it eliminates a step, and also eliminates the material cost of film 60. Examples of platesetters are the Agfa Galileo™ platesetter and the Agfa Polaris 100™ digital platesetting system, available from Agfa Division, Bayer Corporation of Wilmington, Mass.

Proofer 68 is an output device that outputs images. An example of a proofer is the Agfa DuoProof Ultra™ available from Agfa Division, Bayer Corporation of Wilmington, Mass. A proofer can image onto plain paper or other media, and may use techniques including, but not limited to, toner dispersion, thermal wax transfer, and dye sublimation. The proofer may output monochrome images and/or color images. Color images may be imaged using process colors, which are three or four colors that are combined to produce a color image. A proofer may have any line ruling and resolution, although generally the resolution is less than the resolution of the final image. For example, a final image may be imaged by a final output device at 3600 dpi, while the maximum resolution of a proofer may be 600 dpi.

Preproofer 43 converts RIP processed raster data into data that can be displayed by proofer 68. In one embodiment, preproofer 43 is software that runs on a general purpose computer, such as a server class computer running such operating systems as Windows NT™, MacOS™, or a version of UNIX. In another embodiment, preproofer software is included on the same system as a front end 40, a RIP 34, or a print drive 41. If the preproofer is software residing on a front end 40, a RIP 34, or a print drive 41, the system must be of sufficient capacity to handle the added functionality. In another embodiment, preproofer 43 is a dedicated hardware platform.

Figure 2:
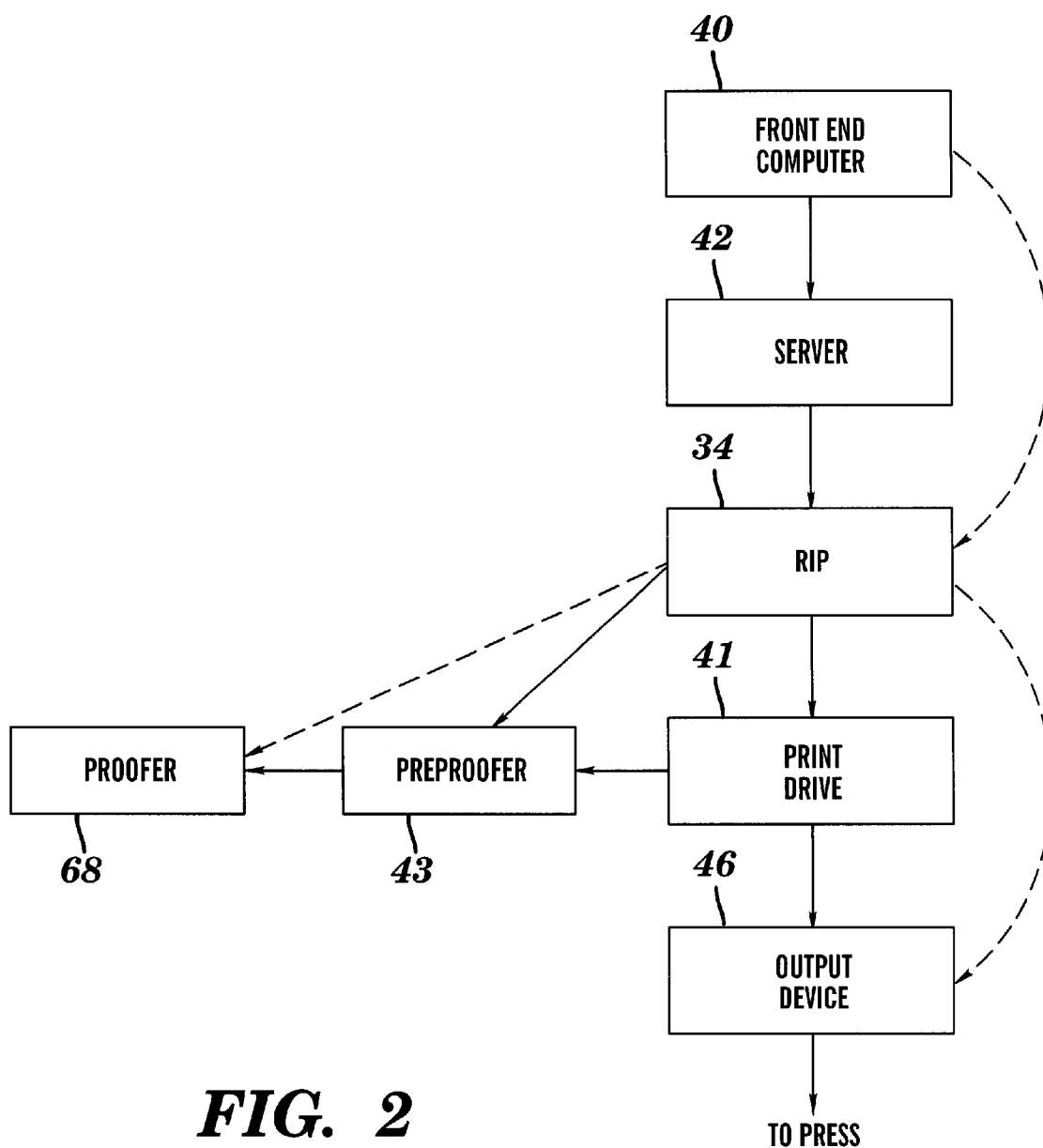
FIG. 2 is a flowchart of an embodiment of the workflow of a job in the prepress imaging system of FIG. 1.

Referring to FIG. 2, the work flow through the system of FIG. 1 begins with the front end 40. The image is designed using an imaging application. The image may be a composite of text and graphics derived from many possible sources. The image may be impositioned on the front end 40, meaning that a number of pages are placed and laid out in the image. The front end 40 may queue the image for processing by sending the job to the image server 42. Alternatively, the front end 40 may output the job directly to a RIP 34. Use of an image server 42 provides the system operator with more constant utilization of the front end 40 and the RIP 34 because neither the front end 40 nor the RIP 34 wait for the other. The image is transmitted to the RIP 34 by either the front end 40 or the image server 42. The image is then processed by the RIP 34. The RIP 34 outputs raster data that results from RIP processing either directly to the output device 46 or to the print drive 41. The print drive 41 stores the raster data until it is ready to be imaged on an output device 46. When the raster data is to be imaged on the output device 46, the print drive 41 transmits the raster data to the output device 46. The output device may image onto film, which is then used to make a plate, or the output device may image onto plate. Plates are used on a press to make the final image.

The proofer 68 may accept bitmap raster files, but may also accept, or may only accept contone images in which a greylevel or color level of each pixel is specified. Generally, the proofer 68 will have the capability of interpreting page description language, or may have an associated hardware or software RIP to process page description language sent to the proofer 68. The proofer 68 may accept raster files when they are "wrapped" in a page description language header and footer if the page description language includes a mechanism to include raster files. The wrapper of page description language before the raster file and after the raster file is sufficient to allow the proofer 68 to process the raster file.

In what is sometimes referred to as contract proof workflow, proofer 68 is used to preview the image as it is processed by RIP 34. An image is sent, in page description language format, from the front end 40 or the image server 42 to the RIP 34. The image is prepared by the RIP 34 to meet the input requirements of the proofer 68 with regard to image size and resolution, and also to maximize the output capabilities of the proofer 68. The final output device 46 may not even be determined at the time the image is sent to the proofer 68, and so the characteristics of the final output device 46 are not reflected in the contract proof. Rather, the output characteristics of the proofer 68 are used to create the RIP output.

The contract proof workflow allows the image to be processed by the same RIP 34 as will later process the image for the final output device 46. The use of the same RIP 34 as will be used later to produce rasters for the final output device 46 eliminates some artifacts that result from the use of different RIPs to create the proof and the final image. The same RIP 46 should interpret the same page description language code in a similar way, even for different output devices. In this workflow, the page description language interpreter normally used by the proofer 68 is bypassed. In one embodiment, contone raster data generated by the RIP 34 is sent to the proofer 68 directly, either in the form of a TIFF file accepted by the proofer 68, or in the form of a page description language wrapper around the TIFF file. The image data sent to the proofer 68 is in the form of a raster data file specifying the image.

It is possible that the differences in the output characteristics of the proofer 68 and the final output device 46 may lead to image artifacts and other differences between the proof image and the final image. The proof image may be the best quality image that the proofer 68 can deliver, but if it has significant differences from the final image, then its usefulness as a proof is limited.

In an alternative to the contract proof workflow, sometimes referred to as imposition workflow, the actual raster produced by the RIP 34 for the final output device 46 is used to image on the proofer. It is generally not possible for proofer 68 to directly use the RIP 34 output intended for the final output device 46 because it is formatted in size and resolution for the final output device 46. A proofer 68 generally requires that colors be specified in one file rather than in separate rasters.

In one embodiment, the proofer 68 is driven by the output of RIP 34 after the rasters are converted by the preproofer 43. In this case the image is RIP processed into raster data for output to the output device 46, a process that produces one or more rasters each having characteristics of the final output device. For example, in one embodiment the rasters have the size, resolution, and screen ruling associated with the output device 46. The rasters are each separations of the same image, with each separation associated with one color of the image. These rasters are binary rasters. It will most likely not be possible to image these rasters directly on the proofer 68. To image the rasters created for the output device 46 on the proofer 68, the rasters need to have their size and resolution adjusted to image at a different resolution. The rasters need to be descreened to convert the rasters from the binary to contone.

It is possible in some cases that the quality of the image as it is output by the proofer 68 may not be as high quality as the contract proof. This is because the image will have been converted from a high resolution raster to a lower resolution image. Descreening may produce imaging artifacts. Nevertheless, the image may more accurately reflect the layout of the final image than the contract proof, since the actual final output rasters are used to produce the contone image.

Figure 3:
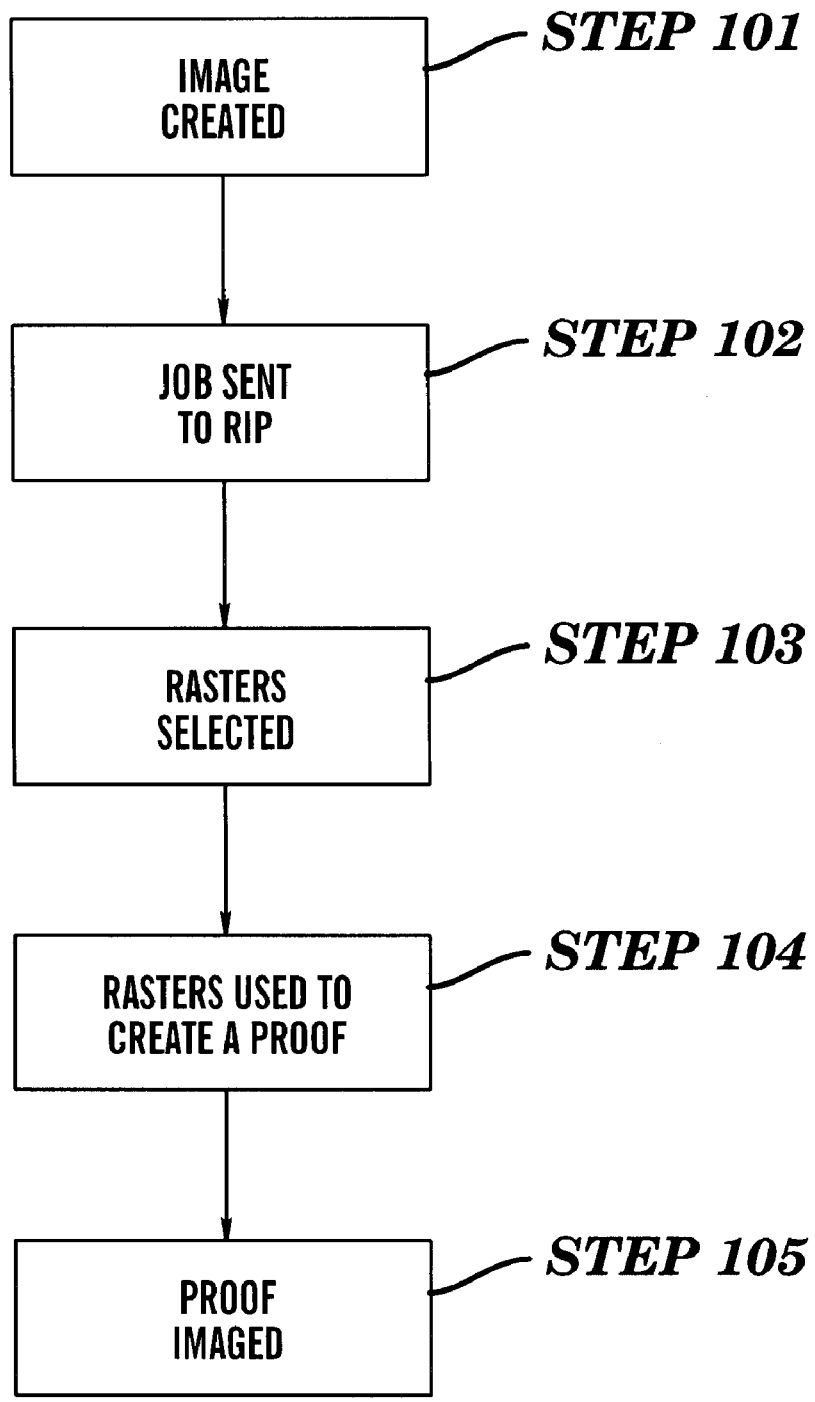
FIG. 3 is a flowchart of an embodiment of the invention using the imaging system of FIG. 1.

Referring to FIG. 3, an image is created in an imaging application (STEP 101). The image is then sent to a RIP (STEP 102). In one embodiment, this is accomplished by printing from the application to the RIP 34, which transmits page description language from the imaging application to the RIP 34. The image is processed by the RIP 34, and the result of RIP processing is raster data. There may be one or more rasters, depending on the number of separations in the image. Once the rasters are produced, they are stored on the RIP 34. In another embodiment, the rasters are transferred to print drive 41. In another embodiment, the images are first sent to an image server 42, which may or may not also be an open prepress interface ("OPI") server. In another embodiment, the user sends page description language, such as Postscript™, to the RIP 34, which may or may not be an OPI server. An OPI server provides a low resolution view file for page layout and inserts high resolution images into the image for RIP processing. The OPI server resolves references to high resolution images, and inserts the high resolution images in the place of the low resolution images as appropriate.

In the next step, one or more of the rasters are selected for imposition proofing (STEP 103). In one embodiment, the system operator selects one or more of the rasters. For example, the system operator may select all of the rasters associated with an image. As another example, the system operator may select only some subset of the color separations for an image. In another embodiment, the images are automatically selected for proofing by the system based on a predetermined criteria. For example, the print drive 41 may be configured to always image a proof when an image is sent to print drive 41.

The selected rasters are then used to create a proof image (STEP 104). The proof image may be in one of several different formats, including but not limited to raster format, TIFF format, or a page description language.

The proof image is then imaged on the proofer (STEP 105). In one embodiment, the proofer accepts raster files, and the raster file is sent directly to the proofer. In another embodiment, the proofer accepts TIFF files, and a TIFF file is sent directly to the proofer. In another embodiment, the proofer accepts only page description language files, including page description language files that include a TIFF file, and so a page description language file is sent that comprises a TIFF file with a page description language wrapper. The wrapper is sufficient page description language for the proofer to accept the TIFF file. In another embodiment, the RIP output is made available to an imaging application, and the imaging application constructs a page containing the RIP output. For example, in one embodiment, the RIP output is a TIFF file, and the imaging application constructs a page containing the TIFF file. This imaging file in page description language output from the imaging application is then sent to the proofer 68. In yet another embodiment, the RIP output is made available to an OPI server, and a low resolution image of the RIP output is made available to the imaging application. For example, if the RIP output is a TIFF file, that TIFF file is made available to the OPI server, and a low resolution image of the TIFF file is made available to the imaging application. When the user sends the file to the proofer 68 from the imaging application, the OPI server automatically inserts the high resolution image.

Figure 4:
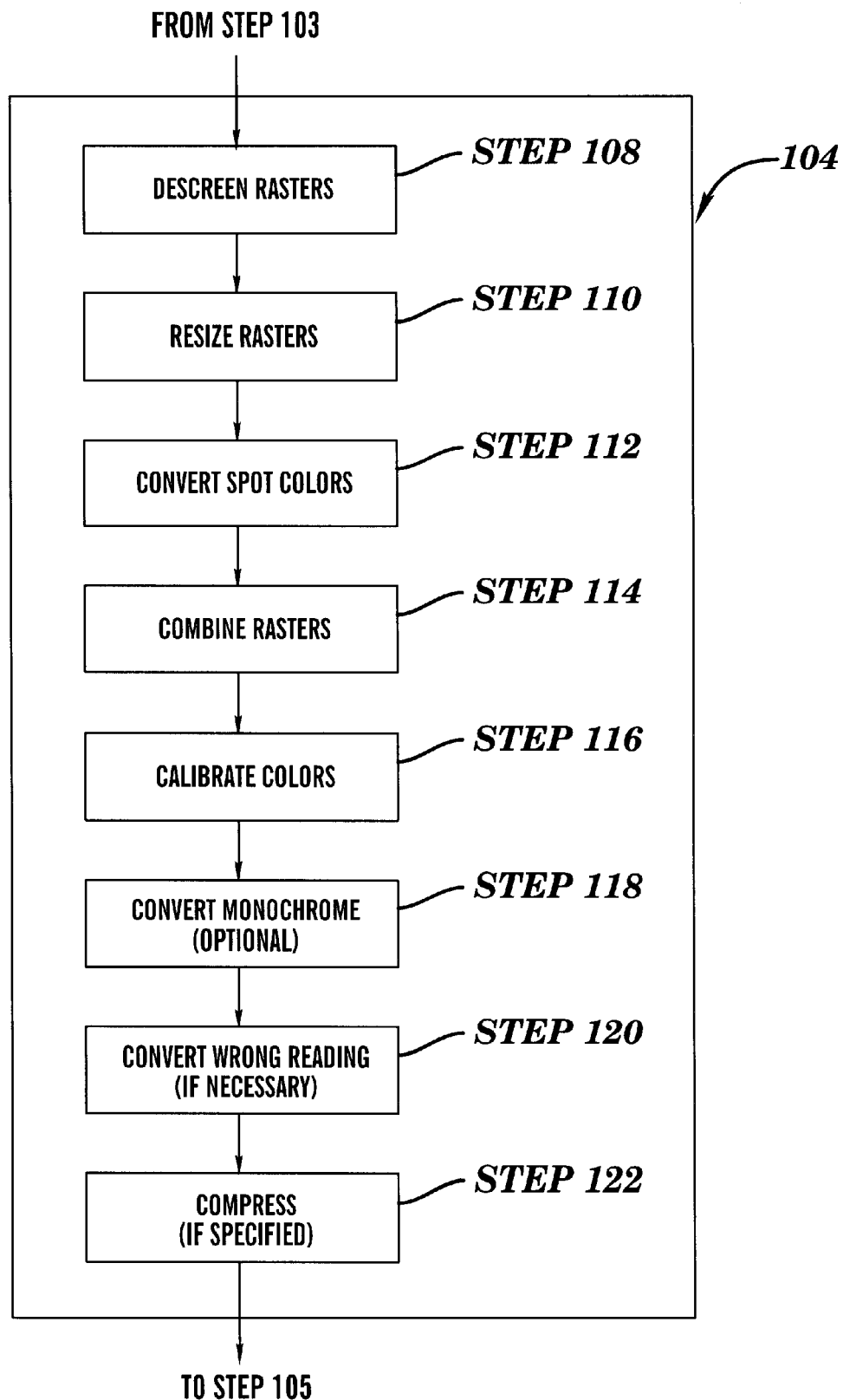
FIG. 4 is a flowchart of an embodiment of the step of using rasters to create a proof of FIG. 3.

Referring to FIG. 4, the process of creating a proof image from the rasters involves several steps. The order shown in FIG. 4 is not necessary to the invention, and the steps may be ordered differently. Some steps may be omitted if not necessary without departing from the scope and spirit of the invention. In one embodiment, the rasters are descreened or converted into color levels (STEP 108), as described below. This is particularly useful for binary rasters. Screening simulates shades of color by grouping pixels in a particular order and shape. The descreening process converts the shaped groupings back into color levels. The result of descreening is an attribution of a color level for each pixel. Various techniques of descreening are encompassed by the invention. In one embodiment, the rasters are descreened by averaging the pixels surrounding the pixel to be descreened.

In the next step, the rasters are resized (STEP 110). This step includes changing the resolution of the image. This step is necessary when the resolution of the proofer is different than the resolution of the output device. This step may be accomplished as part of the descreening step 108. For example, if the rasters are descreened by averaging the pixels, the rasters may be resized with the same calculation.

In the next step, spot colors are converted to process colors (STEP 112). Typically, a proofer does not have the capability of printing a spot color, because it will not have a special ink for a particular color. In general, a color may be simulated by some combination of process colors. In one embodiment, the conversion of spot colors to available colors is accomplished by a lookup table.

Rasters for different color separations are combined into a single raster (STEP 114). This is accomplished by merging the rasters for each color into one file. The descreened, resized rasters have a color level for each pixel. That color level is copied into the merger file. Color levels may be normalized. Spot colors may also be included by assigning the spot color process color values.

The colors may be calibrated to match the colors produced by the press (STEP 116). In one embodiment, this calibration is accomplished with a lookup table. In another embodiment, this is accomplished by use of a mathematical function based on a calibration equation. The equation maps the proofer colors to the colors produced by the press.

If the user desires a monochrome proof, the raster may be converted to monochrome (STEP 118). If the file is "wrong-reading," meaning the direction is inverted, the direction may be corrected (STEP 120). If compression is enabled, the image data may be compressed (STEP 122). In one embodiment, the image data is compressed with Lempel-Ziv-Welch (LZW) compression, which reduces the amount of data required to be transmitted. In one embodiment, whether or not these steps are required is determined by the configuration of the system. In one embodiment, information about the files may be included with the file data. In another embodiment, file information is stored in a separated location. In one embodiment, the preproofing capability is configured to consult information about the file before determining which steps are to be performed.

Figure 5A:
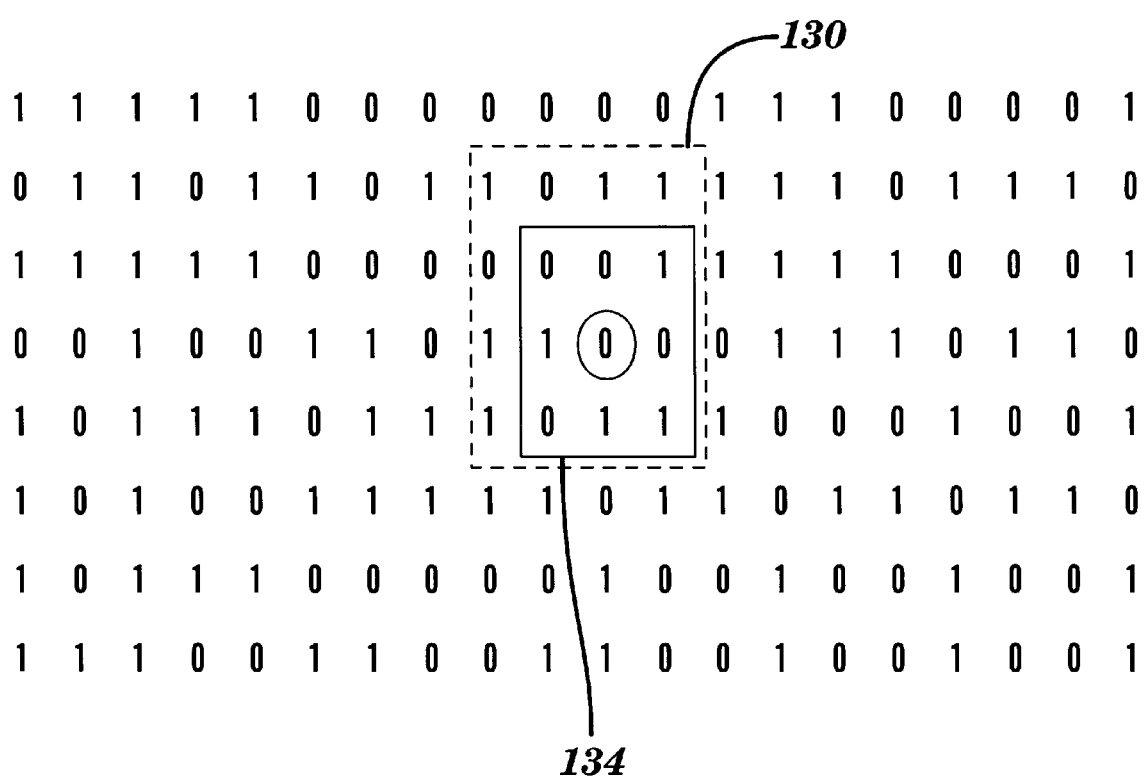
FIG. 5A is a bit map in an embodiment of the descreening step of FIG. 4.

Referring to FIG. 5A, in one embodiment, the descreening step STEP 108 and the resizing step STEP 110 are accomplished by averaging the pixels in the raster. In FIG. 5A, the pixel to be converted is circled. In one embodiment, the number of pixels that are averaged is determined by the RIP processed (input) raster resolution and the proof (output) raster resolution. The input raster resolution is divided by the output raster resolution to determine the number of pixels to be averaged. For example, if the input raster resolution is 2400 dpi, and the output raster resolution is 600 dpi, then the output will be ¼ of the input. The averaging process will average (4×4=16) sixteen pixels to determine a particular output pixel. There is a 4×4 box drawn around the sixteen pixels 130 that are averaged to determine the value of that pixel. If the output raster were to be 1200 dpi, the averaging process would average (3×3=9) nine pixels 134.

In one embodiment, averaging is accomplished by adding the values of the pixels and dividing by the number of pixels. For example, if there are 16 pixels being averaged, and 13 are 1's, then the result of the average is the fraction 13/16. In another embodiment, the averaging is accomplished by summing the pixels together but not dividing. If all output pixels are derived from the same number of input pixels, for example 16 input pixels, the range of the average value for each pixel will be the same, and the same relative result can be determined without the dividing step. It should be noted that if the raster is binary, the number of pixels summed determines the range of the output pixels. Sixteen pixels will result in a range of 0–16. Twenty-five pixels will result in a the range 0–25.

Figure 5B:
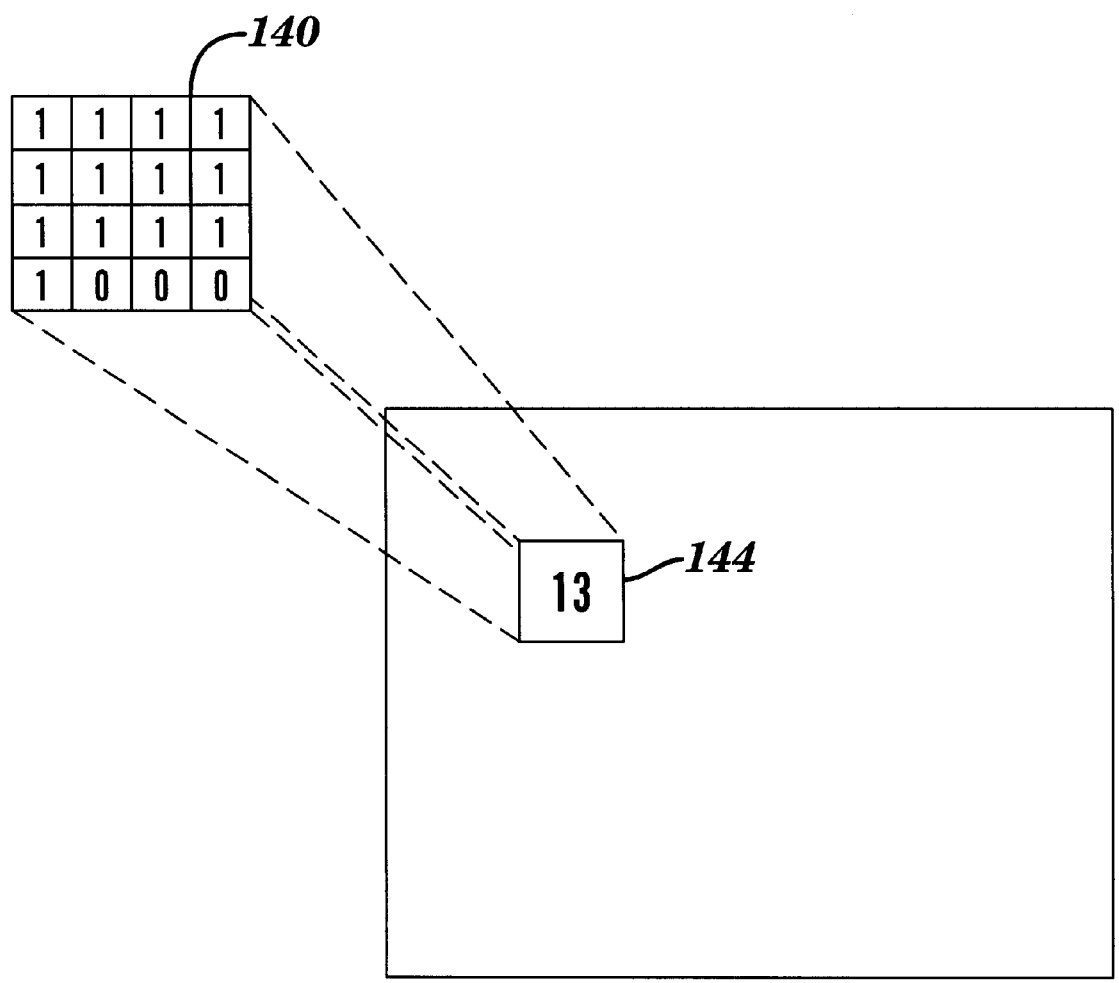
FIG. 5B is a mapping of a raster to a descreened image in an embodiment of the descreening step of FIG. 5A.

Referring to FIG. 5B, a 4×4 group of sixteen pixels 140 in the input raster maps to one pixel 144 in the output raster. In the embodiment shown in FIG. 5B, the total of the sixteen pixels equals 13. The output pixel 144 is shown with the sum value of 13. If the averaging embodiment were used, the output pixel would have the value 13/16. Other methods of descreening and other methods of averaging may be used and are within the scope of the invention. This method has the advantage of being particularly simple to compute, and simultaneously accomplishes descreening and resizing, so it is relatively efficient, and can be accomplished relatively quickly, even on very large images.

In one embodiment, the user can configure the preproofer 43. The configuration is accomplished via a user interface unavailable to the user on preproofer 43. The user interface may also be available on another system in communication with preproofer 43 over the network 35. The configuration includes specification of directories that the preproofer 43 will use. The configuration includes the ability to add, delete, and modify spot color conversion profiles to specify how spot colors may be converted. Spot color conversion profiles specify CMYK equivalents to named spot colors. The configuration includes the ability to select a particular spot color conversion profile. The configuration includes specification of a specific spot color conversion database, to be used for a specific job. The configuration includes specification of a global spot color conversion database. The configuration includes the specification of a color link. The user may create a color link by selecting the final output color space profile, which is typically the CMYK profile for the press, and the proofing color space profile, which is the generic profile of the proofing device to be used. The user can enable or disable solid black enhancement. If enabled, solid black type is not rendered in cyan, magenta, and yellow, but is rendered in black. The configuration includes the ability to invert the image, and to reverse the direction of the image. The files for which the default directory can be specified are input TIFF files, color links, page description language templates, and spot color databases.

The configuration includes specification of proofing modes and number of separations. In one embodiment, the proofing mode and number of separations choices include the following four options: (1) Exactly one separation: black and white grayscale only. (2) Two or more separations: process and spot colors in color. (3) Two or more separations: process and spot colors in black and white grayscale. (4) Two or more separations: process colors in black and white grayscale and spot colors in color. The configuration includes specification of a descreening mode to specify the descreening resolution to be applied. In one embodiment, descreening is automatically applied to binary TIFF files. The configuration includes specification of the output format. In one embodiment, the desired output format is set to either Postscript™ page description language or TIFF file format. The configuration includes specification of a Postscript™ template to use if the output is Postscript™. The configuration includes specification of output compression options, for example whether to use compression, and what type of compression to use. The configuration may include a specification of a default descreening resolution, for example to specify a default resolution of 150 dpi. In one embodiment, a job list is available for queuing preproofing jobs. The job list permits modifying, aborting, and clearing jobs in the queue.

In one embodiment, the preproofer 43 maintains a job log including the job name, the number of processing and spot raster files, the setup options, the time the preproofing operations start and complete each job, and the length of time it too to complete each job. Warnings and errors are also included in the log.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. A method for imaging on a proofer and an output device, comprising the steps of:

processing an image by a raster image processor to create a first raster of the image for imaging on a first output device other than a proofer;

descreening the first raster to form a descreened contone proofer raster of the image that accurately reflects the layout of the first raster;

imaging the proofer raster on the proofer to facilitate a determination of layout acceptability; and imaging the first raster on the first output device based on the layout acceptability determination.

2. The method of claim 1, wherein the step of imaging the proofer raster on the proofer comprises the steps of:

wrapping the proofer raster image in a page description language wrapper; and transmitting the proofer raster image wrapped in a page description language wrapper to the proofer.

3. The method of claim 1 further comprising the step of compensating for characteristics of the proofer by modifying the proofer raster.

4. The method of claim 3 further comprising the step of resizing the proofer raster to fit the image on the proofer.

5. A method for imaging on a proofer and a first output device, comprising the steps of:

processing an image by a raster image processor to create a plurality of first rasters representing color separations of an image for imaging on a first output device other than a proofer;

descreening each of the first rasters to form respective descreened rasters that each accurately reflect the layout of each respective first raster;

combining the descreened rasters into a proofer raster that accurately reflects the layout of the image; and imaging the proofer raster on a proofer to facilitate a determination of layout acceptability on the first output device.

6. The method of claim 5 further comprising, before the imaging step, the steps of:

defining a user-defined output color space; and modifying the proofer raster to conform to the user-defined output color space.

7. The method of claim 6 further comprising the step of compensating for characteristics of an output device by modifying the proofer raster.

8. The method of claim 7 further comprising the step of resizing each of the respective descreened rasters to fit the image on the proofer.

9. The method of claim 8 further comprising the step of decompensating the proofer raster because each of the plurality of rasters representing color separations of the image had been precompensated.

10. The method of claim 9 wherein the step of combining the descreened rasters comprises merging spot colors and process colors into the proofer raster.

11. The method of claim 10 wherein a black color of the proofer raster is attained using black ink without cyan, magenta or yellow ink.

12. The method of claim 10, wherein the step of imaging the proofer raster on the proofer comprises the steps of:

converting the proofer raster image into an user selected format;

saving the proofer raster image; and transmitting the proofer raster image in a page description language to the proofer.

13. A method for imaging an image on a proofer, comprising the steps of:

creating an image having one or more separations with an imaging application thereby forming a description of the image in a page description language;

processing the description of the image in the page description language thereby creating a raster for each color separation associated with the image;

selecting a subset of the rasters for proofing;

descreening, resizing. and combining each of the subset of rasters for proofing;

creating a second page description language file including the descreened, resized, and combined each of the selected subset of the rasters for proofing;

imaging the second page description language file with an output device.

14. The method of claim 13 wherein the selecting step comprises converting each raster into TIFF format.

15. The method of claim 14 wherein the step of creating a second page description language file further comprises converting each of the selected subset of the rasters into TIFF format and wrapping the TIFF format rasters in page description language.

16. A system for imaging an image on a proofer, comprising:

a front end comprising an imaging application for creating an image having one or more separations and for forming a description of the image in a page description language;

a raster image processor for processing the description of the image in the page description language thereby creating a raster for each color separation associated with the image;

a preproofer for selecting a subset of the rasters for proofing, and for descreening, resizing, and combining each of the subset of rasters for proofing to create a second page description language file including the descreened, resized, and combined each of the selected subset of the rasters for proofing; and a proofer for imaging the second page description language file.

17. The system of claim 16 wherein the preproofer converts each of the selected subset of the rasters into TIFF format and wraps the TIFF format rasters in page description language.

18. The system of claim 17 wherein the preproofer descreeens and resizes by averaging.

19. The system of claim 18 wherein the preproofer compensates for characteristics of an output device by modifying the second page description language file.

20. The system of claim 16 wherein the preproofer automatically selects all of the rasters for each color separation associated with the image, and descreens, resizes, and combines all the rasters to create the second page description language file.

* * * * *